OPTICAL SYSTEM FOR PERFORMING DIGITAL LOGIC

Filed May 25, 1964

INVENTOR.
WALTER F. KOSONOCKY
BY
Carl V. Olson
Attorney 3,431,437

OPTICAL SYSTEM FOR PERFORMING DIGITAL LOGIC

Walter F. Kosonocky, Iselin, N.J., assignor to Radio Corporation of America, a corporation of Delaware Filed May 25, 1964, Ser. No. 369,933
U.S. Cl. 307—312 13 Claims
Int. Cl. H03k 19/14, 3/42, 23/12

ABSTRACT OF THE DISCLOSURE

Optical computer circuits wherein signals are represented by presence and absence of light. An inverter logic element for light signals includes a semiconductor laser diode having a unitary elongated planar junction region adapted for light signal amplification in a first direction and adapted for laser oscillation in a second transverse direction. The laser oscillations occur normally to provide an output light signal from the junction region. An input light signal directed through the junction region in the first direction is amplified in the junction region to a value which quenches the laser oscillations and cuts off the output light signal. The inverter is employed also in the performance of the functions of a "nor" gate, and "nand" gate, a bistable multivibrator or flip-flop, and an oscillator.

This invention relates to optical systems for performing logic and other functions in a digital data processing apparatus wherein "0" and "1" information signals are represented by the absence or presence of coherent light.

It is a general object of the invention to provide an improved logic gate for light signals.

It is another object to provide an improved inverter for light signals.

It is a further object to provide improved "nor" and "nand" gates for optical signals.

It is yet another object to provide an improved bistable multivibrator or flip-flop for optical signals.

It is a still further object to provide an improved light signal oscillator.

According to an example of the invention, an inverter logic element for coherent light signals includes a semiconductor laser diode having a planar junction region adapted for light signal amplification in a first direction and adapted for laser oscillation in a second transverse direction. The laser oscillations occur normally in the absence of an input light signal, and the laser oscillations normally provide an output light signal from the junction region. An input light signal directed through the junction region in the first direction is amplified in the junction region to a value which quenches the laser oscillations and cuts off the output light signal.

According to other examples of the invention, the inverter action described is employed in the performance of the functions of a "nor" gate, a "nand" gate, a bistable multivibrator or flip-flop, and an oscillator.

Figure 1:
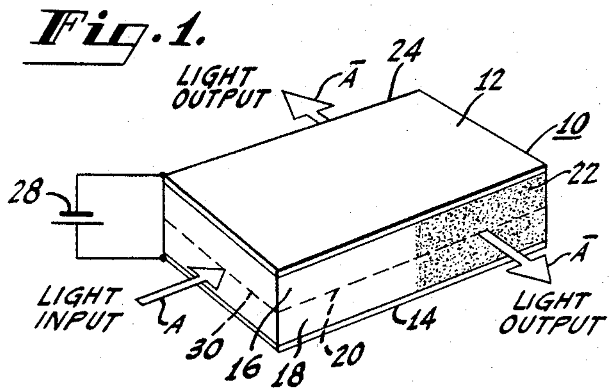
FIG. 1 is a perspective view of a semiconductor laser diode constructed to provide an output light signal which is the logic inverse of an input light signal.
Figure 2:
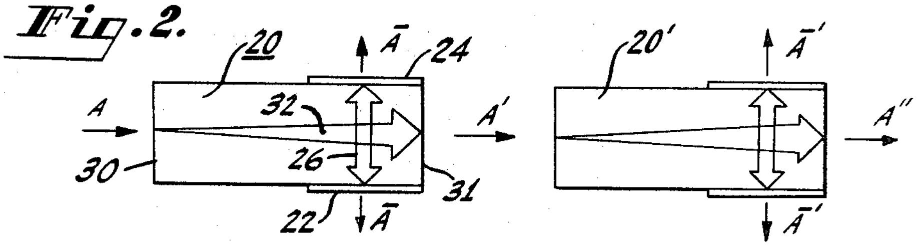
FIG. 2 is a diagram showing the planar junction region of two coupled semiconductor laser diodes like the one shown in FIG. 1.

Reference is now made in greater detail to FIGS. 1 and 2 which show a single-crystal semiconductor diode 10 having an upper electrical terminal 12, a lower electrical terminal 14, a layer 16 of P-type semiconductor material, a layer 18 of N-type semiconductor material and a unitary elongated planar junction region 20 between the P-type and N-type materials. A partially-reflecting surface 22 is provided on a portion of one side of the laser diode 10. A similar partially-reflecting surface 24 is provided on a corresponding portion of an opposite parallel side of the diode 10. If only one output light signal is desired, one of the surfaces 22, 24 may be made totally reflecting.

Partially-reflecting surfaces 22 and 24 may be provided by cleaving or lapping to produce an optically smooth surface. Such an optically smooth surface causes a reflection of about 30 percent of the light which strikes the surface in the normal direction. This amount of reflection is enough to cause laser oscillation in the junction region between the surfaces 22 and 24. The surfaces 22 and 24 may be made more highly reflective by adding a multilayer dielectric coating in a manner well known in the art.

Laser oscillation should be limited to the portion of the junction region between the reflecting surfaces 22 and 24. Therefore, the sides of the semiconductor diode having the reflective surfaces 22 and 24 should be nonreflective elsewhere than at the surfaces 22 and 24. The sides elsewhere than at 22 and 24 can be made nonreflective by making them optically rough, as by etching or grinding, so that light is scattered rather than reflected. Alternatively, the sides elsewhere than at 22 and 24 may be beveled so that light reflected from the beveled surfaces cannot return to the junction region waveguide in a direction in which oscillations can be established.

The electrical terminals 12 and 14 of the diode 10 are connected to a source 28 of direct current bias potential. The bias source 28 may be a constant-voltage source designed to supply a sufficient current flow through the diode 10 to cause laser oscillations 26 in the direction shown between the partially or totally reflecting surfaces 22 and 24. A constant-voltage source 28 may include some current limiting means to prevent damage to the source in the event of a short circuit in the system. Alternatively, the bias source 28 may be a more-expensive constant-current source designed to supply the required current through the diode 10.

The single-crystal semiconductor material 15, 18, 20 of the diode 10 may, for example, be constructed of gallium arsenide. The parallel reflecting surfaces 22 and 24 are spaced apart on opposite edges of the diode 10 by an accurately determined amount so that coherent light oscillations at a frequency peculiar to the semiconductor material are established in the laser oscillator cavity defined by the planar junction region and the reflecting edges. Additional information on gallium arsenide and other laser diodes is given in the following articles: M. I. Nathan et al., Applied Physics Letters, vol. 1, p. 62 (1962); R. N. Hall et al., Physical Review Letters, vol. 9, p. 366 (1962); G. Burns et al., IBM Journal, January 1963, pp. 62–65; G. E. Fenner et al., Journal of Applied Physics, vol. 34, No. 11, November 1963, p. 3204; and T. M. Quist, International Science and Technology, February 1964, pp. 80–88.

The semiconductor laser diode 10 and the junction region 20 therein includes a light signal input edge 30 remote from the laser oscillator portion between the reflecting surfaces 22 and 24. The light signal input edge 30 should be a good light transmitting edge constructed by making the edge optically smooth as by cleaving or lapping, and by applying a light-transmitting coating to the edge. The light transmitting coating may be a quarter-wave-thick coating of a material such as silicon monoxide or calcium tungstate. By such means, substantially all of the input light signal A is transmitted into the junction region of the semiconductor crystal.

The opposite edge 31 of the semiconductor crystal should also be nonreflective so that light rays in the normal direction 32 do not return to the input edge 30. This can be accomplished in a number of ways. The surface 31 may be made optically smooth and provided with a quarter-wave nonreflecting coating as has been described. Alternatively, the surface 31 may be made optically rough, as by sawing or etching, so that light in the direction 32 is scattered and not reflected back to the input edge 30.

Another alternative is to make the edge 31 with a slight optically-smooth bevel so that the light which is reflected cannot return through the optical waveguide constituted by the junction region back to the input edge 30. The use of a beveled edge to prevent optical feedback in an amplifying laser is described in a paper entitled, "Amplification in a Fiber Laser," by C. J. Koester et al., given at the Mar. 25, 1963, meeting at Jacksonville, Fla., of the Optical Society of America. If the angle of the bevel is an angle in the range of between about two and eighteen degrees from the normal to the plane of the junction region 20, substantially all of the light in the direction 32 is transmitted out from the edge 31, and substantially none is reflected back to the input edge 30. Light rays which strike a smooth air-boundary surface at an angle greater than about eighteen degrees from the normal are reflected back into the crystal. The transmitted light, represented at A′, may be used as an input light signal for a second junction region 20′.

Yet another way of preventing reflections from the surface 31 is to make the surface rough, as by etching, to cause a scattering of the light reaching the edge 31. The surfaces 30 and 31 should be made sufficiently nonreflective so that oscillations cannot become established in the junction region between the surfaces 30 and 31.

The electrical bias 28 connected to the electrical terminals 12 and 14 of the diode 10 causes the entire junction region 20 to have an amplifying characteristic for light energy at a given frequency determined by the semiconductor material. Therefore, when an input light signal A of the given frequency is applied to the input edge 30, the signal is amplified in intensity as it travels in the direction 32 through the junction region. An input light signal amplified in the direction 32 is not reflected back and forth in the junction region and therefore laser oscillations are not established in the direction 32. No light of significant amplitude exists in the direction 32 in the absence of an input light signal applied to the input signal edge 30. Further information regarding light amplification in gallium arsenide diodes is given in an article by J. W. Crowe on pp. 57 and 58 of the Feb. 1, 1964, issue of the Applied Physics Letters, vol. 4, No. 3.

Laser oscillations normally exist in the direction 26 between the reflecting surfaces 22 and 24. The laser oscillations 26 build up and are maintained solely as the result of the electrical energy supplied from the bias source 28. The direction 26 of oscillations and the direction 32 of input signal amplification are shown to be orthogonally related. The directions should be nonparallel or intersecting or transverse with relation to each other. The laser oscillator portion of the junction region between surfaces 22 and 24 may, if desired, be supplied with a different value of electrical bias than is supplied to the remaining amplifier portion of the junction region. This can be done by making the electrode 12 in two parts for connection to two bias sources.

In the operation of the inverter logic element shown in FIGS. 1 and 2, a laser oscillation 26 normally exists in the junction region to provide outputs designated $\overline{A}$. The signal outputs are coherent light output signals passed by the partially reflecting surfaces 22 and 24.

When a coherent input light signal A is applied to the input edge 30, the input light signal is amplified in the direction 32. The input light signal A may be a coherent light signal having the same amplitude as the normally present output light signal $\overline{A}$ and may be provided by the output $\overline{A}$ of another logic element. The input light signal A after being amplified in passing through the junction region reaches an amplitude or intensity which is sufficient to saturate the material in the laser oscillator portion of the junction region. When the material is saturated, the laser oscillations are cut off or quenched, with the result that the output light signals $\overline{A}$ are likewise cut off. The laser oscillations and light output signals remain off so long as an input light signal A is applied to the junction region. When the input light signal A is removed, the oscillations 26 immediately resume and provide the output light signals $\overline{A}$.

Figure 3:
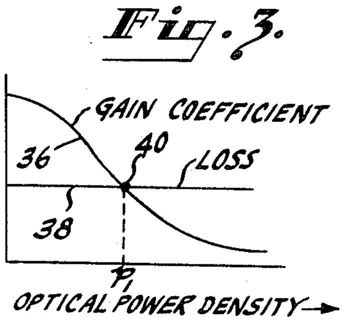
FIG. 3 is a chart which will be referred to in describing the operation of the optical logic element shown in FIGS. 1 and 2.

FIG. 3 is a chart showing the static relationship between the optical power density in the junction region vs. the optical gain coefficient 36 and the optical loss coefficient 38. The chart illustrates the fact that when the optical power density is less than the value $p_1$, the junction region has a light amplifying characteristic because the gain coefficient is greater than the losses due to the escape of light energy. On the other hand, when the optical power density exceeds the value $p_1$, the losses are greater than the gain and neither amplification nor oscillations occur. The operating point 40 represents a static equilibrium condition in the laser oscillator portion of the junction region when oscillations are occurring therein and providing output light signals.

When an input light signal A is applied to the input edge 30, the amplified light reaching the oscillator portion of the junction region increases the optical power density in the oscillator portion of the junction region material. The optical power density is the sum of light energy in the material in all possible directions. The amplified light 32 reduces the amplitude of the oscillations 26 by an amount to maintain the equilibrium operating point 40. However, when the amplified input light energy 32 in the oscillator portion replaces all of the light energy previously in the material due to the oscillations, and then exceeds the amount of light energy previously in the oscillations, the static condition in the material is one wherein the optical gain is less than the optical losses. Under this condition, the oscillations in the direction 26 are quenched and maintained cut off so long as the input light signal A is applied.

The amplified input light signal 32 must have an optical power density in the oscillator portion which is greater than the optical power density in the oscillator portion due to the laser oscillations. For this reason, the use of a light output signal such as $\overline{A}$ provided by one oscillator portion must be amplified before being applied as an input to another oscillator portion. The integral logic element shown in FIGS. 1 and 2 internally provides the necessary amplification so that large numbers of the logic elements can be used in a system with the output of one element serving to provide an input for one or more other elements.

FIG. 2 shows also a second semiconductor laser diode having its junction region 20′ arranged to receive an amplified light signal A′ from the junction region 20 of the first diode. The two smiliar laser diodes shown in FIG. 2 illustrate how a single input light signal A can be employed to inhibit or interrupt the normal light outputs A and $\overline{A}'$ from a plurality of logic elements. If the amplified output light signal A′ from junction region 20 is not desired for any useful purpose, it may be refracted or reflected in a harmless direction, or a light absorber may be placed to receive and terminate the output light signal.

Figure 4:
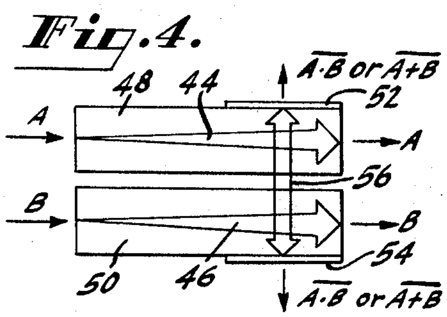
FIG. 4 is a diagram of the junction regions of a semiconductor diode arranged to perform the "nor" function or the "nand" function.

FIG. 4 shows a logic gate for coherent light signals which can be employed to perform the "nor" function or the "nand" function. The actual function performed is determined by the designer in establishing the amplitudes of the input light signals A and B and the amounts of light amplifications 44, 46 in the two junction regions 48 and 50 in relation to the power density normally established as the result of laser oscillations 56. A reflecting surface 52 is provided at an edge of junction region 48, and a reflecting surface 54 is provided at an opposite parallel edge of junction region 50. Laser oscillations 56 occur between the reflecting surfaces in an oscillator portion common to both of the junction regions.

In the operation of the logic element of FIG. 4 in performing the "nor" function, light outputs $\overline{A+B}$ are normally provided in the absence of an input light signal. When one or the other or both of the light inputs A and B are applied, the amount of optical power density in the oscillator portion of the junction region is sufficient to quench or cut off the oscillations and interrupt the light output signals. A "nor" logic element, such as the described element in FIG. 4, is a basic logic building block which can be used to accomplish all necessary logic functions in the performance of Boolean algebra.

In the use of the arrangement of FIG. 4 for the performance of the "nand" function, the light output signals are normally $\overline{A \cdot B}$ in the absence of an input light signal. The presence of a single one of the input light signals A and B does not increase the optical power density in the oscillator portion by an amount sufficient to cut off the output signals. However, when both of the input signals A and B are applied, the optical power density in the oscillator portion does cut off the oscillations and the output light signals.

Figure 5:
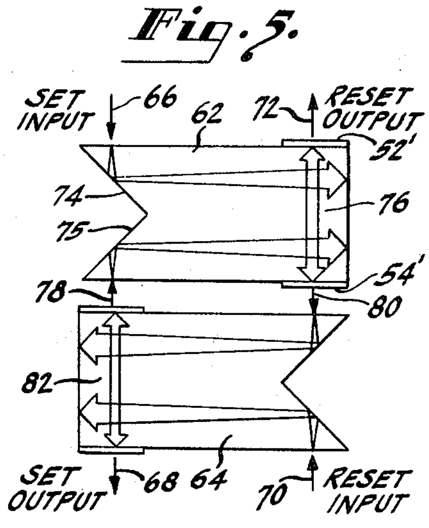
FIG. 5 is a diagram of the junction regions of semiconductor diodes arranged to perform the function of a bistable multivibrator or flip-flop.

FIG. 5 shows two similar junction regions 62 and 64 constructed and arranged to constitute a bistable multivibrator or flip-flop having a "set" light input 66 resulting in a "set" light output 68, and having a "reset" light input 70 resulting in a "reset" light output 72. The light signal input end of the junction region 62 is beveled at 74 to provide a reflecting surface so that the "set" light input signal 66 is reflected to the oscillator portion 76 at the remote end of the junction region. Similarly, a reflecting surface 75 causes a light signal 78 from junction region 64 to be reflected to the oscillator portion 76 of junction region 62. Reflections occur because the light rays in the junction regions strike the surfaces 74 and 75 at an angle from the normal which is about 45 degrees and is greater than the critical angle of 18 degrees. The semiconductor diode including the junction region 62 is constructed so that oscillations in the oscillator portion 76 are quenched whenever a "set" input 66 is applied, or whenever an input 78 is applied from junction region 64.

Junction region 64 is receptive to a light input 80 from junction region 62, and it has an oscillator portion 82. Junction regions 62 and 64 may be constructed exactly alike. Each of the junction regions 62 and 64 constitute a "nor" gate similar to the "nor" gate described in connection with FIG. 4. The "nor" gates illustrated in FIGS. 4 and 5 reperesent different constructions as regards the maners in which two input light signals are applied to an oscillator portion. The two structures are also different in that FIG. 4 shows physically separated junction regions 48 and 50, whereas FIG. 5 shows a single junction region 62, or 64, which is employed for the same purpose. In both FIG. 4 and FIG. 5, the basic building block is a unitary junction region all of which is adapted for amplification in one direction and solely part of which is adapted for laser oscillation in a second transverse direction.

In the operation of the bistable multivibrator or flip-flop of FIG. 5, the flip-flop always provides either a "reset" light output 72 or a "set" light output 68. It will be initially assumed the flip-flop is in the "reset" state providing a "reset" light output 72 due to oscillations in the oscillator portion 76 of junction region 62. Under this condition, the light output 80 from the oscillator portion 76 is applied to the junction region 64 where it is amplified and causes a quenching of oscillations in the oscillator portion 82 of junction region 64.

If a "set" light input 66 is now applied to the junction region 62, the input light is amplified and causes a quenching of the oscillations in oscillator portion 76 and a cutting off of the "reset' light output 72. The light output 80 is also cut off, with the result that oscillations can immediately build up and become established in the oscillator portion 82 of the junction region 64. This provides a "set" light output 68 indicating that the flip-flop is now in the "set" sate. At the same time, the light output 78 from the oscillator portion 82 is directed with amplification to the oscillator portion 76 of junction region 62 where it continues to quench the oscillations in portion 76 after the "set" light input signal 66 is removed.

The flip-flop, which is now in the "set" state, can be switched to the "reset" state by the application of a "reset" light input pulse at 70. The flip-flop remains in whichever state it has been switched to by the last received "set" or "reset" input light pulse.

Figure 6:
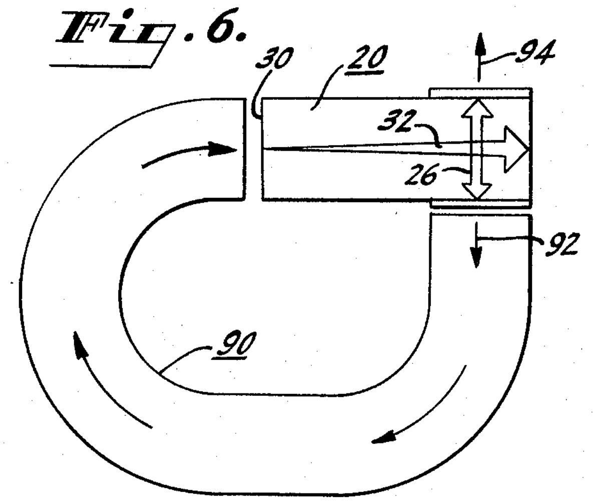
FIG. 6 is a diagram of a free-running light signal oscillator.

FIG. 6 shows a free-running light signal oscillator including a light signal inverter 20 like the light signal inverter shown in FIGS. 1 and 2. In addition, the oscillator includes a delay line 90 for coupling output light signals, after a delay, back to the input signal edge 30. The optical delay line 90 may be constituted by an optical fiber, or a deposited film optical waveguide. Alternatively, the output light may be returned to the input edge 30 by reflections from appropriately placed mirrors. The length of the optical delay line 90 is chosen in terms of the desired frequency of oscillation. A length of about one foot is appropriate for oscillations having a period of one nanosecond, and a length of about one-tenth of a foot is appropriate for oscillations having a period of one-tenth of a nanosecond.

In the operation of the oscillator of FIG. 6, the oscillator portion of the junction region 20 normally provides laser oscillations in the direction 26. Output light in the direction 92 is conveyed through the optical waveguide 90 back to the light signal input edge 30. Light entering the edge 30 is amplified in the junction region 20 to a value causing a quenching of the oscillations 26. Thereafter, the reduction or elimination of the output light signal 92 permits the oscillations 26 to build up again. The oscillating action continues at a frequency determined by the optical length of the optical delay line 90. The light output at 94 is a light signal which oscillates in amplitude in accordance with the changes in amplitude of the laser oscillations 26 in the junction region.

The logic elements shown in the drawing constitute building blocks for use in the construction of a computer wherein "0" and "1" information signals are represented by the absence or presence of coherent light in various light signal paths. The light output from any one of the logic elements may be employed as an input light signal for one or a plurality of other logic elements. The light signals may be channeled from one logic element to another using the high directional characteristic of the coherent light from the junction regions of the logic elements. All of the logic elements may be uniformly dimensioned and mounted on a substrate so that the light signals remain in the same plane. The light signals may cross each other in the plane without one signal affecting the other. A computer constructed of the described semiconductor laser diode logic elements is capable of extremely fast operation due to the extremely high switching characteristics of the diodes and the extremely high transmission speeds of light signals due to the absence of reactive effects.

What is claimed is:

1. The combination of:

a semiconductor laser diode including a unitary elongated junction region adapted for light signal amplification in a first direction from a signal input end to a signal output end, and adapted for laser oscillation in a second intersecting direction at solely said output end, means to normally derive an output light signal in said second direction from said junction region, and means to apply an input light signal in said first direction to said input signal end of the junction region to cut off said laser oscillations and output signal in said second direction.

2. The combination of:

a semiconductor laser diode including a unitary elongated junction region adapted for light signal amplification in a first direction from a signal input end to a signal output end, and adapted for laser oscillation in a second intersecting direction at solely said output end, means to normally derive an output light signal in said second direction from said junction region, and means to apply an input light signal in said first direction to said input signal end of the junction region to produce an amplified light signal which quenches said laser oscillations and output signal in said second direction.

3. The combination of:

a semiconductor laser diode including a unitary elongated planar junction region adapted for light signal amplification in a first direction from a signal input end to a signal output end, and adapted for laser oscillation in a second orthogonal direction at solely said output end, means to normally derive an output light signal in said second direction from said junction region, and means to apply an input light signal in said first direction to said input signal end of the planar region to produce an amplified light signal which quenches said laser oscillations and output signal in said second direction.

4. The combination of:

a source of electrical bias, a semiconductor laser diode including electrical terminals connected to said bias source and including a unitary elongated junction region adapted for light signal amplification in a first direction from a signal input end to a signal output end, said junction region including at least a portion having opposite reflecting edges to normally provide laser oscillations in a second nonparallel direction at solely said output end at least one of said reflecting edges being partially reflecting to normally transmit a light signal output, and means to direct an input light signal in said first direction to said input signal end of the junction region to cut off the laser oscillations and light output signal in said second direction.

5. The combination of:

a source of electrical bias;

a semiconductor laser diode including electrical terminals connected to said bias source and including a unitary elongated planar junction region adapted for light signal amplification in a first direction from a signal input end to a signal output, said junction region including at least a portion having opposite reflecting edges to normally provide laser oscillations in a second direction orthogonally related to said first direction at solely said output end, at least one of said reflecting edges being partially reflecting to normally transmit a light signal output, and means to direct an input light signal in said first direction to said input signal end of the junction region to cut off the laser oscillations and light output signal in said second direction.

6. A signal inverter for coherent light signals, comprising:

a source of electrical bias, a semiconductor laser diode amplifier including electrical terminals connected to said bias source and including a unitary elongated light signal amplifying junction region having an input light signal edge and having a laser oscillator portion remote from said input signal edge, said laser oscillator portion having opposite parallel reflecting edges at least one of which is only partially reflecting to normally transmit an output from the laser oscillator portion of the inverter, and means to direct an input light signal to said input light signal edge, through the light-signal amplifying junction region, and through the laser oscillator portion thereof in a nonparallel direction in relation to the direction of laser oscillations therein and with an amplitude to cut off the laser oscillations and the light output signal from the inverter.

7. A signal inverter for coherent light signals, comprising:

a source of electrical bias, a semiconductor laser diode amplifier including electrical terminals connected to said bias source and including a unitary elongated light signal amplifying planar junction region having an input light signal edge and having a laser oscillator portion remote from said input signal edge, said laser oscillator portion having opposite parallel reflecting edges at least one of which is only partially reflecting to normally transmit an output from the laser oscillator portion of the inverter, and means to direct an input light signal to said input light signal edge, through the light signal amplifying junction region, and through the laser oscillator portion thereon in a direction transverse to the direction of laser oscillations therein and with an amplitude to cut off the laser oscillations and the light output signal from the inverter.

8. The combination of:

a source of electrical bias, a semiconductor laser diode including electrical terminals connected to said bias source and including a unitary elongated junction region all of which is adapted for laser signal amplification and solely part of which is adapted for laser oscillation, means to normally derive an output signal from said laser oscillations, and means to apply a plurality of input light signals through said junction region to quench said laser oscillations.

9. A "nand" logic element for coherent light signals comprising:

a source of electrical bias, a semiconductor laser diode including electrical terminals connected to said bias source and including a unitary elnogated junction region all of which is adapted for laser signal amplification in a first general direction and solely part of which is adapted for laser oscillation in a second transverse direction, means to normally derive an output signal in said second direction from said laser oscillations, and means to apply a plurality of input light signals through said planar junction region in said first direction, said input signals when all are present being amplified in said junction region to a value of optical power density which quenches said laser oscillation.

10. A "nor" logical element for coherent light signals comprising:

a source of electrical bias, a semiconductor laser diode including electrical terminals connected to said bias source and including a unitary elongated junction region all of which is adapted for laser signal amplification in a first general direction and solely part of which is adapted for laser oscillation in a second transverse direction, means to normally derive an output signal in said second direction from said laser oscillations, and means to apply a plurality of input light signals through said planar junction region in said first direction, any one of said input light signals being amplified in said junction region to a value sufficient to quench said laser oscillations.

11. A bistable multivibrator for coherent light signals, comprising:

a source of electrical bias, two light signal inverters each being constituted by a semiconductor laser diode amplifier including electrical terminals connected to said bias source and including unitary elongated signal amplifying junction region having an input light signal edge and having a laser oscillator portion remote from said input signal edge, said laser oscillator portion having opposite parallel partially reflecting edges to normally transmit light outputs from the laser oscillator portion of the inverter, means to couple a light output signal of each of said inverters to the input light signal edge of the other inverter, means to apply a "set" input light signal to the input signal edge of one of the inverters, and means to apply a "reset" input light signal to the input light signal edge of the other one of the inverters.

12. A bistable multivibrator for coherent light signals, comprising:

a source of electrical bias, a light signal inverter providing a "set" output light signal and a similar inverter providing a "reset" output light signal, each of said inverters being constituted by a semiconductor laser diode amplifier including electrical terminals connected to said bias source and including a unitary elongated signal amplifying junction region having an input light signal edge and having a laser oscillator portion remote from said input signal edge, said laser oscillator portion having opposite parallel partially reflecting edges to normally transmit light outputs from the laser oscillator portion of the inverter, means to couple a light output signal of each of said inverters to the input light signal edge of the other inverter, means to apply a "set" input light signal to the input light signal edge of the inverter providing a "reset" output, and means means to apply a "reset" input light signal to the input light signal edge of the inverter providing a "set" output.

13. An optical flip-flop, comprising:

a light signal inverter providing a "set" output light signal and a similar inverter providing a "reset" output light signal, each of said inverters being constituted by a laser amplifier including a unitary elongated signal amplifying region having an input light signal edge and having a laser oscillator portion, means to couple a light output signal of each of said inverters to the input light signal edge of the other inverter, means to apply a "set" input light signal to the input light signal edge of the inverter providing a "reset" output, and means to apply a "reset" input light signal to the input light signal edge of the inverter providing a "set" output.

References Cited

UNITED STATES PATENTS

| | | | |
|---|---|---|---|
| 3,098,112 | 7/1963 | Horton | 331—94.5 |
| 3,242,440 | 3/1966 | Koester et al. | 331—94.5 |
| 3,257,626 | 6/1966 | Marinace et al. | 331—94.5 |
| 3,317,848 | 5/1967 | Keyes | 331—94.5 |

OTHER REFERENCES

Novotny: "One GaAs Laser Is Quenched by Another," Electronics, July 26, 1963, pp. 57–58.

JEWELL H. PEDERSEN, *Primary Examiner.*

RONALD L. WIBERT, *Assistant Examiner.*

U.S. Cl. X.R.

331—94.5; 350—160; 250—220